United States Patent [19]

Blassingame

[11] Patent Number: 5,163,845
[45] Date of Patent: Nov. 17, 1992

[54] PORTABLE FREE-STANDING VISUAL AID

[76] Inventor: Carol L. Blassingame, 1904 Dartmouth, G-1, College Station, Tex. 77840

[21] Appl. No.: 646,182

[22] Filed: Jan. 28, 1991

[51] Int. Cl.⁵ .................... B43L 1/00; B43L 1/02; A63B 69/00; G09B 9/00; G09B 19/00
[52] U.S. Cl. .................... 434/408; 434/247; 434/248; 434/413; 434/417; 434/422
[58] Field of Search ............... 434/408, 413, 415, 416, 434/417, 422, 423, 499, 247, 248, 259

[56] References Cited

U.S. PATENT DOCUMENTS

| | | | |
|---|---|---|---|
| 217,289 | 7/1879 | Kane | 434/416 |
| 3,432,944 | 8/1969 | Toyoishida | 35/66 |
| 3,560,092 | 2/1971 | Coney | 434/248 |
| 3,642,191 | 2/1972 | Roof | 434/408 |
| 3,685,170 | 8/1972 | Fairleigh | 35/29 R |
| 3,838,520 | 10/1974 | Quenot | 434/408 |
| 4,487,586 | 12/1984 | Palmans | 434/408 |
| 4,676,527 | 6/1987 | Palmer | 434/248 |
| 4,834,334 | 5/1989 | Robins | 248/441.1 |
| 4,968,258 | 11/1990 | Kees | 434/370 |

OTHER PUBLICATIONS

The Sporting Goods Dealer, "Play Board" Mar. 1979.

Primary Examiner—Gene Mancene
Assistant Examiner—C. A. Cherichetti
Attorney, Agent, or Firm—Mary J. Gaskin

[57] ABSTRACT

A portable, free-standing visual aid designed to be used by coaches, teachers and other group leaders. The invention incorporates a large chalkboard, a chalk tray, sliding, two-sided inserts, a storage pocket for the inserts, and a smaller storage pocket for other items. It has a handle for portability. Some models use releasable fasteners to hold a chalk holder and eraser.

4 Claims, 3 Drawing Sheets

007

PORTABLE FREE-STANDING VISUAL AID

FIELD OF INVENTION

The present invention relates to a portable apparatus which is used as a teaching aid and storage case by coaches, instructors, and others.

BACKGROUND OF THE INVENTION

Numerous teaching and coaching situations require the use of chalkboards and other visual aids for instructional purposes. However, certain instructional situations occur outside the ordinary classroom with its fixed chalkboards and/or require frequent changes of location. On such occasions, a practical, lightweight, portable visual aid would be a valuable instructional tool. In addition, instructors and coaches often must carry with them notebooks, rosters, grade books, skill sheets, clipboards, stopwatches, chalk, erasers, and other materials. A portable visual aid which also functions to contain these materials would be a valuable instructional tool.

At the present time, there are no practical, lightweight, portable visual aids available which can be easily transported to different locations and which are adaptable for use with large or small groups of students or athletes.

Chalkboards now available have wooden or metal frames and are difficult to transport. A chalkboard must be carried by holding the frame directly which causes structural stress on the frame assembly, resulting eventually in a break-down of the frame. Chalkboards do not have any attached compartments or means for carrying items such as chalk, erasers, clipboards, grade books, skill sheets, fitness cards, stopwatches, etc. A chalkboard designed for transportation to a variety of locations also has a limited writing surface area.

At the other end of the spectrum, clipboards are used frequently as visual aids by physical education instructors or coaches, but their use as a visual aid for a large group or class is impractical, since viewing is limited to the immediate area around the clipboard.

It is an object of this invention to provide a practical, lightweight, portable visual aid for teachers and coaches, one which remedies the limitations of visual aids presently in use.

The visual aid described herein provides:
(1) lightweight construction;
(2) a large writing surface area, including a permanent chalkboard and interchangeable inserts with blank surface areas or permanent fields, courts, or lines of choice, on both surfaces;
(3) a detachable handle for carrying the aid and for hanging it on fences, poles, etc.;
(4) free standing capability on any flat surface;
(5) a pocket compartment for storage of the inserts; and
(6) a smaller pocket compartment for carrying other items.

The visual aid can be used to convey written instruction, objectives, assignments, game arrangements and strategies, etc.

The visual aid would be useful to anyone who needs a portable visual aid for any location, including physical education teachers, coaches, classroom teachers, workshop leaders, scout leaders, camp counselors, trainers, etc.

SUMMARY OF INVENTION

The visual aid described herein is lightweight, portable, and versatile. Rectangular in shape, it has a permanent blank chalkboard. Double-sided inserts may be slid in front of the chalkboard, as needed. When not in use, the inserts are stored in a durable pocket on the back of the frame. A smaller pocket attached to the larger pocket accommodates a plurality of smaller items.

The visual aid has a handle for transporting it from one location to another. It is freestanding on a flat surface. The handle can be detached so that the visual aid may be hung on a fence, hook, etc., if necessary.

The visual aid is both durable and water resistent. The four corners of the frame are rounded for safety reasons.

DESCRIPTION OF THE PREFERRED EMBODIMENT

Figure 1:
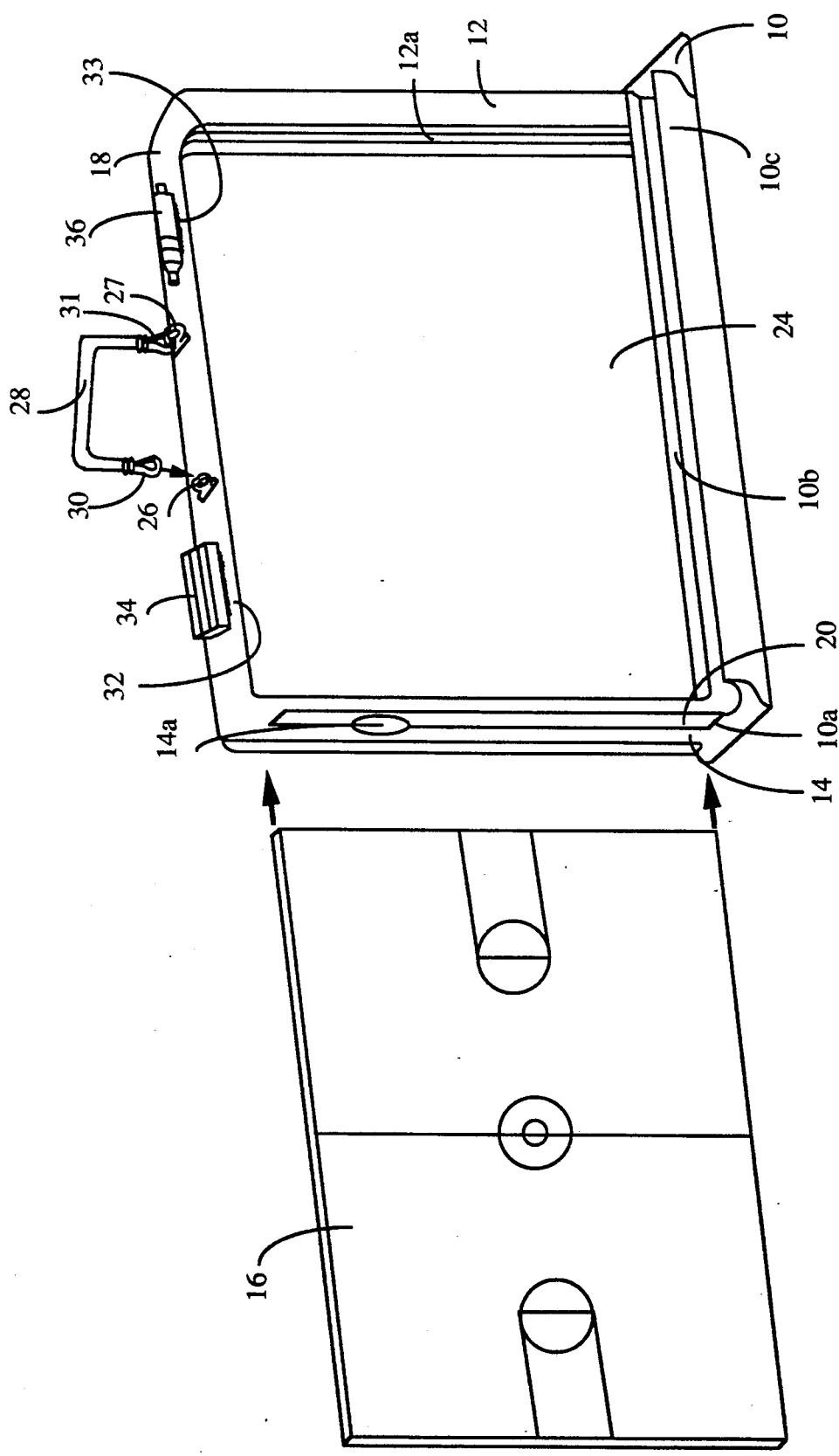
FIG. 1 is a perspective view of the front of the visual aid, showing its permanent writing surface; it also shows an insert before it is slid into place.

Referring to FIG. 1, the invention has the general configuration of a rectangle, with a frame comprising base member 10 parallelly spaced from top member 18 and side members 12 and 14 spaced parallel to each other and perpendicular to base member 10 and top member 18. The frame may be constructed of joined wooden pieces or may be formulated from molded plastic.

A rectangular chalkboard 24 is permanently supported by the frame members, 10, 12, 14 and 18. The usable surface of chalkboard 24 can be seen in FIG. 1, the front view of the invention. Chalkboard 24 is recessed toward the back of the supporting frame members 10, 12, 14 and 18.

In front of the chalkboard 24, running the inside length of each frame member, is routed groove 10a in bottom member 10, routed groove 12a in side member 12, and a routed groove (not shown) in top member 18. Opening 20 is cut entirely through the length of side member 14. Opening 20 and the routed grooves temporarily support sliding insert 16, which is slid through opening 20 and rests in the routed grooves 10a, 12a, and the one not shown in 18. A curved recess 14a in side member 14 along a portion of opening 20 permits easy finger grasp of sliding insert 16. Sliding insert 16 is a rectangular flat board with two (2) surfaces, which may be any of the following: chalkboard surface; blank dry-wipe surface; permanent field, court, or lines of choice on chalkboard or dry-wipe surface.

As can be seen in the drawings, base member 10 is configured to be wider and longer than parallelly-spaced top member 18; base member 10 also has a flat bottom surface. These features allow the visual aid to be free standing and stable.

Cut into the length of base member 10 is a slot 10b which functions as a repository for chalk dust. In addition, a chalk tray 10c projects outwardly along the front length of base member 10.

Eye screws 26 and 27, or other securing means, are attached to top member 18, each approximately onethird from either end of top member 18. Handle 28 is detachably attached to eye screws 26 and 27 with hook clasps 30 and 31, each permanently attached to either end of handle 28.

Two female velcro pads 32 and 33 are attached to the top surface of top member 18. Chalkboard eraser 34 with a male velcro pad glued to its backing can be stored on female velcro pad 32. Chalkholder 36 with a male velcro pad glued to its backing can be stored on female velcro pad 33.

Figure 2:
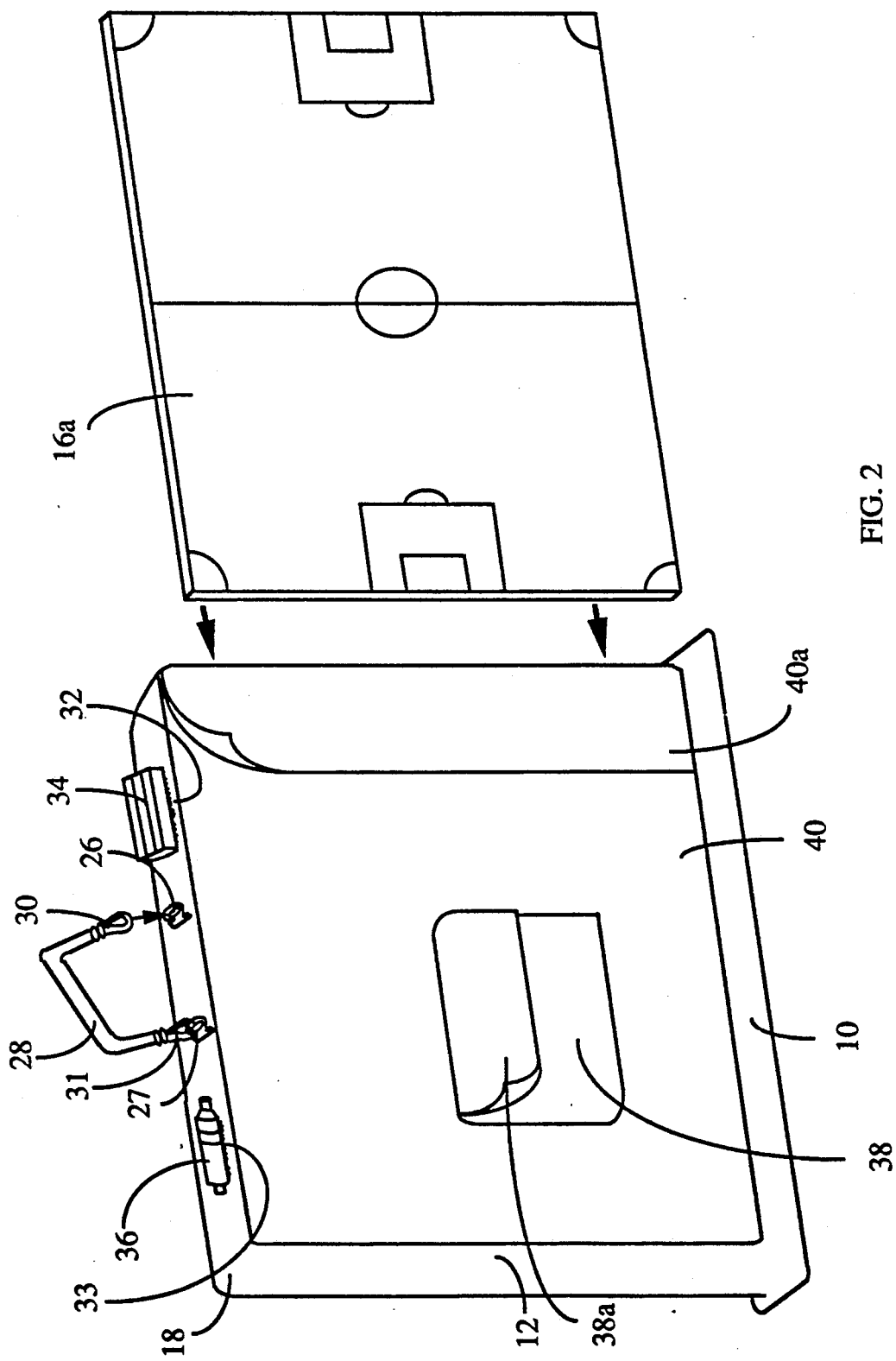
FIG. 2 is a perspective view of the back of the visual aid and its pockets; it also shows the back of an insert before it is slid into place.

FIG. 2, which shows the back side of the visual aid, shows an example of a permanent field marked on the back 16a of sliding insert 16. In addition, the view shows the back of the visual aid covered by a rectangular large pocket 40, made of a durable fabric or other flexible material. The pocket is glued to the back side of chalkboard 24, visible in FIG. 1. Large pocket 40 is used for storing sliding inserts and is closed with large flap 40a. The flap is secured to the pocket by corresponding male and female velcro pads. Centrally attached to large pocket 40 is small pocket 38 with small flap 38a, said pocket suitable for storing a plurality of smaller objects.

Figure 3:
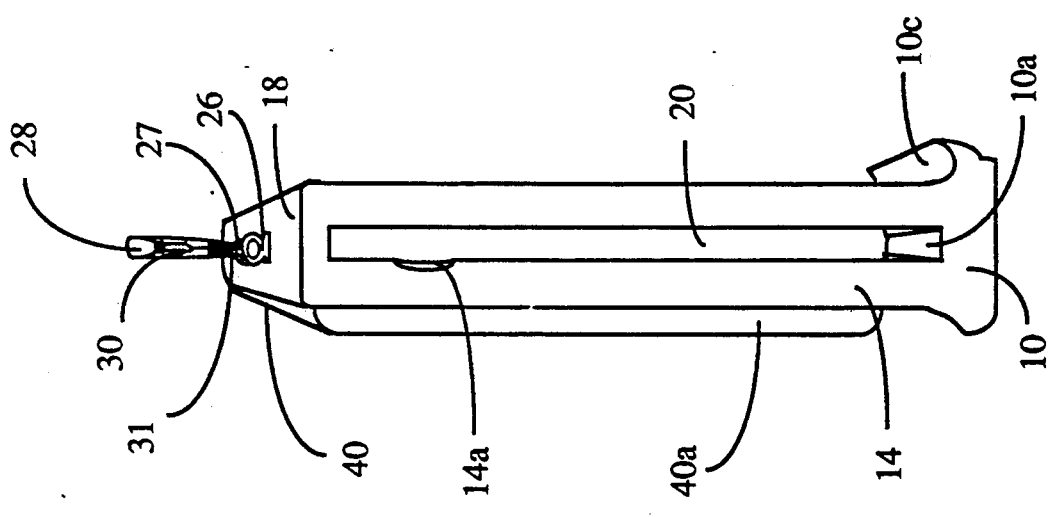
FIG. 3 is a side elevational view of the visual aid.

FIG. 3 shows more clearly opening 20 (for receiving sliding insert 16), chalk tray 10c, and the configuration of large pocket 40 and large flap 40a.

I claim:

1. A visual aid which comprises:
   (a) four frame members attached to form a rectangle, said frame members consisting of a top member parallelly disposed to a longer, wider bottom member and two side members parallelly disposed to each other;
   (b) an erasable rectangular writing surface secured to the rearward portion of said frame;
   (c) routed grooves running along the inside surfaces of said top member, one of said side members and said bottom member;
   (d) an opening cut through the other said side member;
   (e) a rectangular board with two (2) flat writing surfaces, said board being slideably insertable into said opening, with the edges of said board containable in said routed grooves;
   (f) a large, rectangular receptacle means attached to rear side of said rectangular writing surface for storage of at least one of said rectangular boards;
   (g) smaller receptacle means centrally attached to the outside of said large receptacle means, for storage of a plurality of items; and
   (h) carrying means attached to the top surface of said top member.

2. A visual aid according to claim 1, wherein at least one flat writing surface of said rectangular board is permanently marked with diagrammatic lines.

3. A visual aid according to claim 2 wherein a chalk tray projects outwardly form the front surface of said bottom member along said bottom member's length.

4. A visual aid according to claim 3 wherein two (2) releasable fastening elements are secured to the top of said top member, to which a holder of chalk and an eraser back may be releasably attached by other releasable fastening elements, one secured to the back of said holder of chalk and the other secured to said eraser back.

* * * * *